United States Patent
Banham et al.

(10) Patent No.: US 10,737,964 B2
(45) Date of Patent: Aug. 11, 2020

(54) PROCESS FOR FORMING AN ARTICLE WITH A PRECISION SURFACE

(71) Applicant: MEDIA LARIO S.R.L., Bosisio Parini (IT)

(72) Inventors: Robert David Banham, Leiston (GB); Giuseppe Valsecchi, Oggiono (IT); Oberto Citterio, Inveriga (IT)

(73) Assignee: MEDIA LARIO S.R.L., Bosisio Parini (IT)

( * ) Notice: Subject to any disclaimer, the term of this patent is extended or adjusted under 35 U.S.C. 154(b) by 395 days.

(21) Appl. No.: 15/519,122

(22) PCT Filed: Oct. 12, 2015

(86) PCT No.: PCT/EP2015/073527
§ 371 (c)(1),
(2) Date: Apr. 13, 2017

(87) PCT Pub. No.: WO2016/058975
PCT Pub. Date: Apr. 21, 2016

(65) Prior Publication Data
US 2017/0233281 A1    Aug. 17, 2017

Related U.S. Application Data

(60) Provisional application No. 62/064,043, filed on Oct. 15, 2014.

(51) Int. Cl.
*C03B 23/035* (2006.01)
*C03C 27/04* (2006.01)
(Continued)

(52) U.S. Cl.
CPC .......... *C03B 23/0357* (2013.01); *B29C 53/04* (2013.01); *B29D 11/00596* (2013.01);
(Continued)

(58) Field of Classification Search
CPC ........ B29D 11/00596; B29D 11/00865; B29L 2011/0058; G02B 5/10; C03B 23/035;
(Continued)

(56) References Cited

U.S. PATENT DOCUMENTS 4,038,014 A      7/1977  Dusza et al.
4,268,332 A *    5/1981  Winders .................. B23P 15/00
                                                     156/160
(Continued)

FOREIGN PATENT DOCUMENTS

EP          2463094 A1    6/2012

OTHER PUBLICATIONS

International Search Report; PCT Application No. PCT/EP2015/073527; dated Jul. 11, 2016.
(Continued)

*Primary Examiner* — Philip C Tucker
*Assistant Examiner* — Jimmy R Smith, Jr.
(74) *Attorney, Agent, or Firm* — Polsinelli PC

(57) ABSTRACT

A process for forming an article having at least one precision surface is disclosed. The process includes providing a thin sheet in contact with a surface of a mandrel. The process then includes establishing a pressure differential between opposite sides of the thin sheet using a collapsible enclosure so that the thin sheet is drawn onto the mandrel surface, thereby causing the thin sheet to substantially conform to the shape of the mandrel surface. The shaped thin sheet is then secured to a support member to define the article. The article is then removed from the mandrel. The front surface of the thin sheet defines the precision surface of the article. A process for forming a dual-sided precision article is also disclosed, along with an adaptive optical system and method that employs the precision article.

6 Claims, 5 Drawing Sheets

(51) Int. Cl.
*G02B 5/10* (2006.01)
*B29L 11/00* (2006.01)
*B29D 11/00* (2006.01)
*B29C 53/04* (2006.01)

(52) U.S. Cl.
CPC ........ *B29D 11/00865* (2013.01); *C03C 27/04* (2013.01); *G02B 5/10* (2013.01); *B29L 2011/0058* (2013.01)

(58) Field of Classification Search
CPC ............. C03B 23/0352; C03B 23/0357; F24S 2023/833; F24S 2023/832; F24S 23/82
USPC ............... 156/196, 242, 244.14, 244.21, 249
See application file for complete search history.

(56) References Cited

U.S. PATENT DOCUMENTS

| | | | | |
|---|---|---|---|---|
| 4,364,763 | A | * | 12/1982 | Rennerfelt ............. C03B 19/06 264/1.7 |
| 2003/0131792 | A1 | * | 7/2003 | Park .................. C23C 16/45557 118/712 |
| 2005/0037224 | A1 | * | 2/2005 | Orford .................. B21D 26/02 428/593 |
| 2007/0273067 | A1 | * | 11/2007 | Anderson .............. B29C 33/68 264/511 |
| 2011/0198021 | A1 | * | 8/2011 | Meyer .................... B29C 51/08 156/212 |
| 2014/0234581 | A1 | | 8/2014 | Immerman et al. |
| 2014/0315016 | A1 | * | 10/2014 | Dollase ............... H01L 31/0481 428/339 |

OTHER PUBLICATIONS

Written Opinion of PCT Application No. PCT/EP2015/073527; dated Jul. 11, 2016.

* cited by examiner

PROCESS FOR FORMING AN ARTICLE WITH A PRECISION SURFACE

CROSS-REFERENCE TO RELATED APPLICATIONS

This application is a national stage entry of PCT/EP2015/073527 filed Oct. 12, 2015, which claims priority to U.S. provisional patent application 62/064,043 filed on Oct. 15, 2014, the contents each of which are hereby incorporated by reference in their entirety.

FIELD

The present disclosure relates to processes for forming precision articles, and in particular to a process for forming an article with a precision surface.

The entire disclosure of any publication or patent document mentioned herein is incorporated by reference.

BACKGROUND

Precision articles are objects that have at least one precision feature and are used in a variety of commercial and industrial applications. One type of precision article is an optical component such as a mirror, wherein the precision feature is the mirror surface. Such optical components tend to be difficult and expensive to form, especially at large scales, e.g., large mirrors for large optical instruments such as telescopes.

Consequently, there is a need for a scalable process for making precision articles that is also simple and cost-effective.

SUMMARY

The present disclosure relates to processes for forming precision articles, which are articles that have at least one precision surface. An aspect of the disclosure also relates to the precision article as an article of manufacture formed by the processes disclosed herein.

Aspects of the disclosure include a process for forming an article having a precision surface. The process includes providing a thin sheet in contact with a surface of a mandrel. The process then includes establishing a pressure differential between opposite sides of the thin sheet using a collapsible enclosure so that the thin sheet is drawn onto the mandrel surface, thereby causing the thin sheet to substantially conform to the shape of the mandrel surface. The shaped thin sheet is then secured to a support member to define the article. The article is then removed from the mandrel. The front surface of the thin sheet defines the precision surface of the article.

Aspects of the disclosure include a process for forming a dual-sided precision article, and an adaptive optical system and method that employs the precision article.

An aspect of the disclosure is process for forming a precision article. The process includes: providing a thin sheet of material having front and back surfaces; placing the front surface of the thin sheet of material in contact with a surface of a mandrel, wherein the surface of the mandrel has a surface shape; arranging a collapsible enclosure around at least a portion of the thin sheet and at least a portion of the mandrel to form a sealed interior, with a portion of the back surface of the thin sheet interfacing with an external environment; forming at least a partial vacuum in the sealed interior to define a pressure differential between the sealed interior and the external environment, thereby causing the thin sheet to substantially conform to the mandrel surface to form a shaped thin sheet; securing the back side of the thin sheet to a support structure to define the precision article; and removing the precision article from the mandrel.

Another aspect of the disclosure is the process as describe above, wherein the external environment has a pressure of one atmosphere.

Another aspect of the disclosure is the process as describe above, wherein the external environment is defined by an environmental control chamber having an interior with a pressure, and wherein the interior pressure is controllable, e.g., to between 1 atmosphere and 10 atmospheres.

Another aspect of the disclosure is the process as describe above, wherein the thin sheet is made of glass.

Another aspect of the disclosure is the process as describe above, wherein the mandrel resides within the collapsible enclosure.

Another aspect of the disclosure is the process as describe above, further including coating the front surface of the shaped thin sheet with one or more layers of material to define a reflective surface either at a select wavelength or over a select range of wavelengths.

Another aspect of the disclosure is the process as describe above, wherein the support structure is secured to the shaped thin sheet by a layer of securing material.

Another aspect of the disclosure is the process as describe above, wherein the layer of securing material is an adhesive having a nominal thickness of 50 microns.

Another aspect of the disclosure is the process as describe above, wherein the collapsible enclosure is in the form of a bag.

Another aspect of the disclosure is the process as describe above, wherein the precision article defines a mirror.

Another aspect of the disclosure is a process for forming an article having a precision surface. The process includes: providing a thin sheet having front and back opposite surfaces, and placing the front surface in contact with a surface of a mandrel, where the mandrel surface has a surface shape; establishing a pressure differential between front and back surfaces of the thin sheet so that the thin sheet is drawn onto the mandrel surface, thereby causing the thin sheet to substantially conform to the shape of the mandrel surface to form a shaped thin sheet; securing the shaped thin sheet to a support member to define the article; and removing the article from the mandrel, wherein the front surface of the shaped thin sheet defines the precision surface of the article.

Another aspect of the disclosure is the process as describe above, wherein the pressure differential is nominally 1 atmosphere.

Another aspect of the disclosure is the process as describe above, wherein the pressure differential is between 1 atmosphere and 10 atmospheres.

Another aspect of the disclosure is the process as describe above, wherein the thin sheet is made of glass.

Another aspect of the disclosure is the process as describe above, wherein forming the pressure differential includes arranging a collapsible enclosure around at least a portion of the thin sheet and at least a portion of the mandrel to form a sealed interior, and at least partially evacuating the sealed interior.

Another aspect of the disclosure is the process as describe above, and further including coating the precision surface with one or more layers of material to define a reflective surface at either select wavelength or over a select range of wavelengths.

Another aspect of the disclosure is the process as describe above, wherein the support structure is secured to the shaped thin sheet by a layer of securing material.

Another aspect of the disclosure is the process as describe above, wherein the layer of securing material is an adhesive having a nominal thickness of 50 microns.

Another aspect of the disclosure is a process for forming a dual-sided precision article. The process includes: providing first and second thin sheets each having front and back opposite surfaces; placing the front surfaces of each of the front sheets in contact with respective first and second surfaces of first and second aligned mandrels, where the first mandrel surface has a first surface shape and the second mandrel surface has a second surface shape that is complementary to the first surface shape; establishing pressure differentials between front and back surfaces of each of the first and second thin sheets so that the first and second thin sheets are drawn onto their corresponding first and second mandrel surfaces, thereby causing the first and second thin sheets to substantially conform to the surface shapes of the respective first and second mandrel surfaces to respectively form first and second shaped thin sheets; securing the shaped thin sheets to opposite sides of a common support member to define the article; and removing the article from the first and second mandrels, wherein the front surfaces of the first and second shaped thin sheets define the first and second precision surfaces of the dual-sided precision article.

Another aspect of the disclosure is the process as describe above, wherein the dual-sided precision article has a substantially uniform thickness in the range from 2 mm to 6 mm.

Another aspect of the disclosure is the process as describe above, wherein the support member is a solid layer of glass or lightweight metal having a substantially uniform thickness in the range from 1 mm to 2 mm.

Another aspect of the disclosure is the process as describe above, wherein the precision article has a diameter of at least 1 meter.

Another aspect of the disclosure is a process of forming an adaptive optical system. The process includes: performing the process described above to form the dual-sided precision article; and operably supporting the first precision surface with an array of independently addressable actuators arranged to locally deform the dual-sided precision article to define a select surface shape for the second precision surface.

Another aspect of the disclosure is the process as describe above, wherein the actuators are operably connected to a controller that includes a non-transient computer-readable medium having instructions embodied therein that cause the actuators to be independently activated to define the select surface shape.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Figure 1:
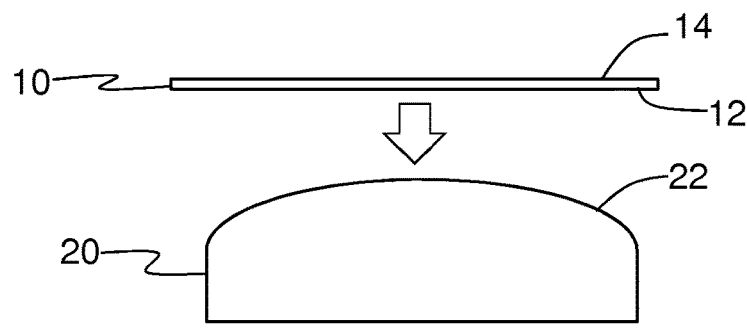
FIG. 1 is a schematic side view of an example thin sheet being brought into contact with the surface of a mandrel.

With reference to FIG. 1, a thin sheet 10 with a front surface 12 and a back surface 14 is provided relative to a mandrel 20 with a surface 22. In an example, the thin sheet 10 starts out nominally flat or planar and is sufficiently thin so that it is flexible, and further in an example is deformable. In an example, thin sheet 10 has a known amount of surface roughness, which further in an example is below a certain tolerance for the given application. The thin sheet 10 is sufficiently thin so that it can take the form of the mandrel surface 22 when processed in the manner described below. In an example, thin sheet 10 has a thickness in the range from about 10 microns to about 2 mm, or in the range from 10 microns to about 1 mm. The exact thickness of thin sheet 10 depends on the material of the thin sheet and the degree to which it will be deformed, as well as the lateral size (e.g., diameter or like dimension) of the precision article being contemplated.

An example material for thin sheet 10 is glass, such as float glass. Float glass has a very good (i.e., relatively low) surface roughness, e.g., generally on the order of a few nanometers down to sub-nanometer. On the other hand, float glass has relatively poor surface shape due to waviness induced during the floating process and as such, is typically considered unsuitable for precision optics. The surface shape variation (amplitude) of float glass can be on the order of about 0.25 micron to 1 micron over a 1 mm to 10 mm spatial frequency. Such surface shape properties can produce an optical reflection distorted to $1\lambda$ to $4\lambda$, where $\lambda$ is a visible wavelength of light. Such optical reflections are usually considered unacceptable for ordinary optical applications. However, the processes disclosed herein allow for the use of such materials having such shortcomings because such waviness can be substantially reduced or eliminated. Other materials for thin sheet 10 include other types of glass and high-quality polymers, e.g., polycarbonate sheet and polyamide films, and metallic sheets and foils.

Figure 2A:
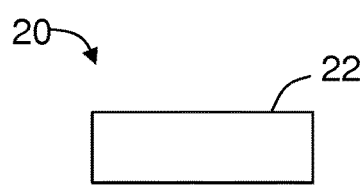
FIGS. 2A through 2C are cross-sectional views of example mandrels illustrating example mandrel surface shapes.
Figure 2B:
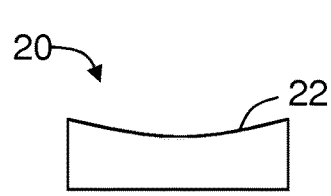
Figure 2C:
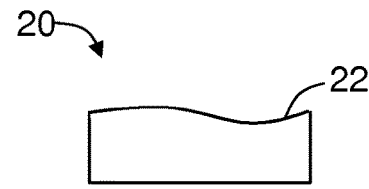

The front surface 12 of thin sheet 10 is placed in intimate contact with mandrel surface 22. The mandrel surface 22 has a known surface shape. In an example, the mandrel surface 22 has an amount of surface roughness, and in an example the amount of surface roughness is known (e.g., is measured), while in another example is unknown but is below a certain threshold amount. The mandrel 20 can be made of any reasonable material used for conventional mandrels. The mandrel surface 22 can have any reasonable shape, such as flat, concave, convex, undulating, free form, etc. Example surface shapes for mandrel surface 2 are shown FIGS. 2A through 2C.

In an example, mandrel 20 is sufficiently rigid to maintain its surface shape during the process. In an example, mandrel surface 22 can be actively controlled, such as by actuators configured to adjust the shape of the mandrel surface. Mandrel 20 can be formed of a solid block of material to ensure the stability of the surface shape of the mandrel surface 22. Mandrel 20 can also be hollow to reduce its weight while having sufficient thickness to ensure the stability of the surface shape of the mandrel surface 22.

Figure 3:
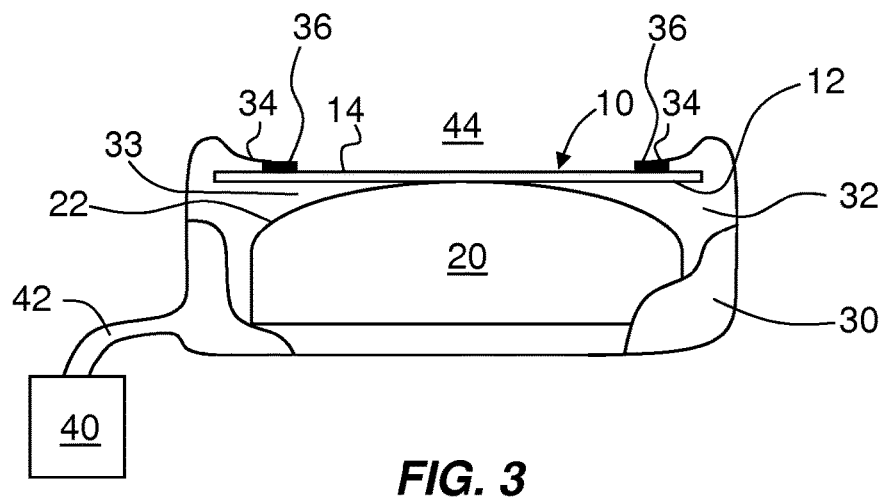
FIG. 3 is a partial cut-away view showing the collapsible enclosure operably arranged relative to the thin sheet and the mandrel to form a sealed interior that allows for the formation of a pressure differential on opposite sides of the thin sheet.

With reference now to FIG. 3, a collapsible enclosure 30 is operably arranged with respect to the thin sheet 10 and mandrel 20. The arrangement creates a sealed interior 32 that is defined in part by the front surface 12 of thin sheet 10 and the mandrel surface 22. The region of sealed interior 32 that resides between the front surface 12 of thin sheet 10 and the mandrel surface 22 is denoted 33.

In an example, collapsible enclosure 30 is made of a flexible or semi-flexible material that can support a vacuum within sealed interior 32. In an example, flexible enclosure 30 is or includes a vacuum bag, and in example can include features that enhance flexibility, such as bellows, folds, etc. (not shown). The flexible enclosure 30 includes an edge 34 that is sealed to thin sheet 10, e.g., on back surface 14, using a sealing material 36, such as an adhesive. The sealed interior 32 defines a sealed environment that surrounds at least a portion of mandrel 20 that includes the mandrel surface 22 (or at least a portion thereof). In an example, mandrel 20 resides entirely within the collapsible enclosure 30 and thus entirely within sealed interior 32.

Figure 4:
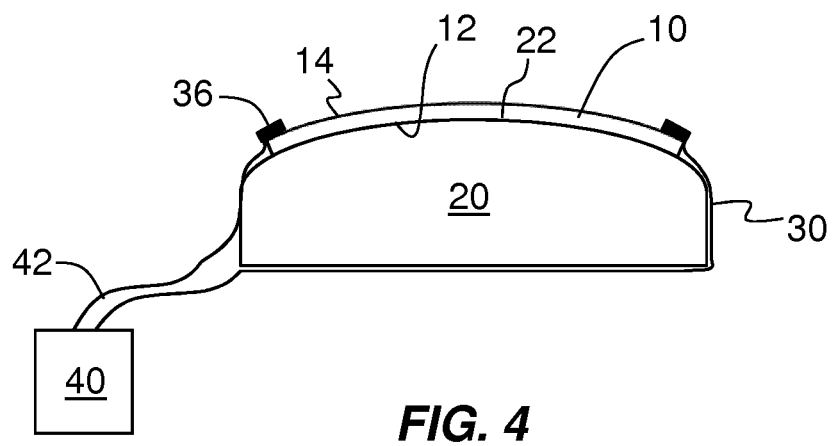
FIG. 4 shows the formation of the shaped thin sheet as substantially conforming to the mandrel surface due to the pressure differential causing the thin sheet to be drawn onto the mandrel surface, and also shows the collapsed state of the collapsible enclosure.

In an example, the sealed interior 32 of collapsible enclosure 30 is pneumatically connected to a vacuum pump 40, e.g., via a vacuum conduit 42. Vacuum pump 40 is operated to evacuate sealed interior 32, i.e., to form at least a partial vacuum therein relative to an external environment 44 at back surface 14 of thin sheet 10. This causes a pressure differential $\Delta P$ between sealed interior 32 and the external environment 44, and in particular in region 33. This pressure differential causes thin sheet 10 to be drawn onto mandrel surface 22. This in turn causes the thin sheet 10 to bend, flex, slump, deform, etc., so that some or all of the front surface 12 of the thin sheet 10 comes into contact with mandrel surface 22, causing the thin sheet to substantially conform to the surface shape of mandrel surface 22. The result of the part of the process is shown in FIG. 4, which shows a collapsed collapsible enclosure 30 and a shaped thin sheet 10S arranged in intimate contact with mandrel surface 22.

Figure 5:
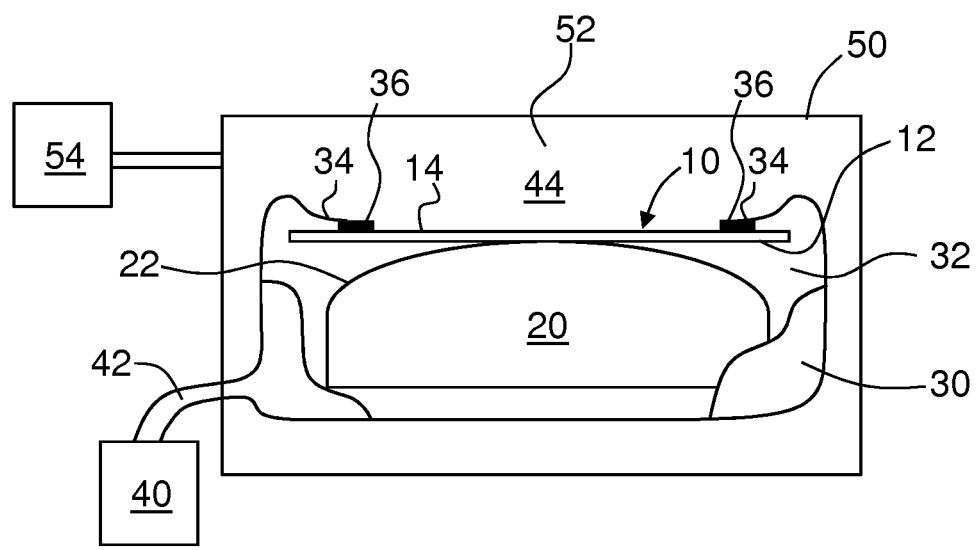
FIG. 5 is similar to FIG. 3 and illustrates an embodiment wherein an environment control chamber contains the thin sheet, the mandrel and the collapsible enclosure so that the external environment outside of the sealed interior of the collapsible enclosure can be controlled to provide, for example, a greater pressure differential or to provide increase squeezing pressure during other parts of the fabrication process.

An example aspect of the process involves carrying out one or more steps of the process as disclosed herein under select environmental conditions, e.g., at a select temperature or temperature range, a select pressure or pressure range, etc. To this end, with reference to FIG. 5, in an example, an environmental control chamber ("chamber") 50 is employed to define the external environment 44. The chamber 50 has an interior 52 that contains thin sheet 10, mandrel 20, and collapsible enclosure 30. The chamber 50 is configured to control the environmental conditions within interior 52, such as the temperature, pressure, humidity, atmosphere, etc. For example, the differential pressure $\Delta P$ can be increased beyond 1 atmosphere by increasing the pressure of interior 52 via the operation of a compressor 54 that is operably connected to the chamber interior. In an example, the increase pressure differential $\Delta P$ can be applied at any time or step (or for multiple steps) in the process, such as after the shaped thin sheet 10S is formed, as well as for other process steps to be described below.

The amount of vacuum in collapsible enclosure 30 defines the pressure differential $\Delta P$, which in an example can vary from zero to 1 atmosphere. The use of ultra-high vacuum is not necessary. In the case that it is necessary to apply more than 1 atmosphere of pressure—for example, for a thicker or more rigid material for thin sheet 10—greater external pressure can be generated using chamber 50. In an example, the pressure differential $\Delta P$ using chamber 50 can be up to tens of atmospheres. In the Figures and the discussion below, the chamber 50 is omitted for ease of illustration and explanation.

In an example, the process for conforming thin sheet 10 to mandrel surface 22 to form shaped thin sheet 10S is carried out a process temperature $T_C$ that is below the melting point temperature $T_P$ and the glass transition temperature $T_T$ of the material that makes up the thin sheet. Under this condition, the thin sheet 10 can take the general shape of the mandrel surface 22 without the surface roughness thereon being imprinted onto the shaped thin sheet 10S. Thus, the conforming process described above has the advantage that it does not impart the undesirable surface roughness component of mandrel surface 22 while at the same time imparting the desired overall surface shape component. Thus, as mentioned above, shaped thin sheet 10S is said to substantially conform to mandrel surface 22. This is particular important in cases where the shaped thin sheet 10S needs to define a high-quality finished surface for a precision article such as a mirror.

Figure 6:
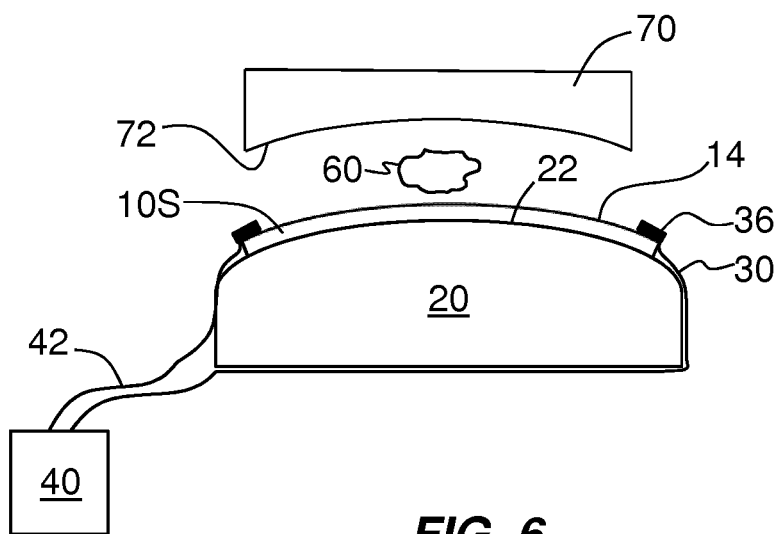
FIG. 6 is similar to FIG. 4 and shows a support structure in the process of being secured to the back surface of the shaped thin sheet using a securing material.

FIG. 6 is similar to FIG. 4 and also shows the next step in the process wherein an amount of securing material 60 is provided between the back surface 14 of the shaped thin sheet 10S and a front surface 72 of a support structure 70. The securing material 60 can be applied to the back surface 14 of the shaped thin sheet 10S or to the front surface 72 of the support structure. In an example, securing material 60 can be in the form of a film. In an example, securing material can be an adhesive, a bonding material or a cement material. In the discussion below, the securing material 60 is assumed to be an adhesive and is thus referred to below as adhesive 60 for ease of discussion.

In an example, support structure 70 is pre-machined from a machinable material. In an example, support structure 70 has a unitary construction, and further in an example is has a molded construction. Support structure 70 can be of many types or designs that provide sufficient mechanical support and rigidity to the shaped thin sheet 10S while also being sufficiently lightweight. In an example, support structure 70 can be made of a solid block of material. In an example, the thickness of the support structure 70 at surface 72 is 10% to 20% of the maximum dimension of the support structure.

In another example, support structure 70 can be a pre-machined structurally light weighted member. In another example, support structure 70 can include an integrated temperature control system incorporated therein, e.g., cooling channels. Support structure 70 can have a honeycomb structure, and can be formed from a fiber-reinforced composite. Because the support structure 70 is combined with shaped thin sheet 10S in the manner described below, the support structure can be formed using conventional machining and/or molding processes to produce a complex structure designed to benefit the final precision object formed. In an example, support structure 70 is a thin layer of material that provides sufficient support while also being flexible.

A benefit of completely forming support structure 70 prior to the interfacing step described below is that it avoids the need to further process the support structure, which can impart forces, stress, strains, etc. that can adversely affect the shaped thin sheet 10S.

Figure 7:
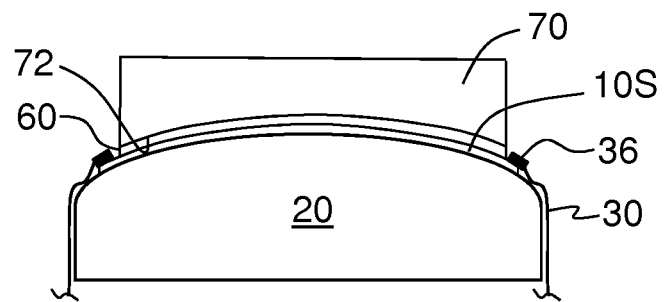
FIG. 7 is similar to FIG. 6 and shows the support structure secured to the back surface of the shaped thin sheet using the securing material, which is now in the form of a thin layer of securing material.

With continuing reference to FIG. 6, the front surface 72 of support structure 70 is interfaced with the back surface 14 of the shaped thin sheet 10S with adhesive 60 being interposed between the two surfaces. The resulting structure is shown in FIG. 7.

The adhesive 60 spreads into a thin layer as the two surfaces are brought into close proximity. A thin and uniform layer of adhesive 60 is preferred due to the volume change of epoxy-type adhesives that occurs during curing. The thinner the adhesive layer 60, the less volume change that can occur in absolute terms. The more uniform the adhesive layer 60, the less volume change that can occur in relative terms. In an example, adhesive layer 60 is made as thin as possible to minimize optical defects due to shrinkage (percentage of variable thickness) and to avoid shear mode failure, but thick enough to achieve a good joint. In one example, the thickness of the adhesive layer 60 can be about 100 microns, while in another example requiring higher surface tolerances, the nominal thickness can be about 50 microns.

In an example, adhesive 60 is a two-component or heat-cured adhesive since the adhesive layer is not exposed to air for normal "drying." As noted above, adhesive 60 is preferably selected to avoid volume changes during curing or to have shrinkage/viscosity characteristics that minimize deformation of shaped thin sheet 10 during curing. This property is more common in two-component epoxies with low exothermal characteristics. For the purpose of application of adhesive 60, it is desirable that the viscosity of the mixed adhesive, ready to apply, is below 1000 centipoise. An example of a preferred adhesive 60 is one that completely cures at room temperature to avoid the aforementioned adverse effects of thermal expansion.

Once the adhesive layer 60 is formed, it is allowed to cure. In an example, the curing of adhesive layer 60 is facilitated by the application of heat and additional external pressure (e.g., via environmental control chamber 50) to compress any air bubbles trapped between mandrel surface 22 and the front surface 12 of shaped thin sheet 10S. This results in the shaped thin sheet 10S being bonded to the surface 72 of support structure 70. This defines a precision article 80 having a surface 82, wherein one precision feature of the article is the surface 82, which in the example shown is defined by the front surface 12 of shaped thin sheet 10S.

Figure 8:
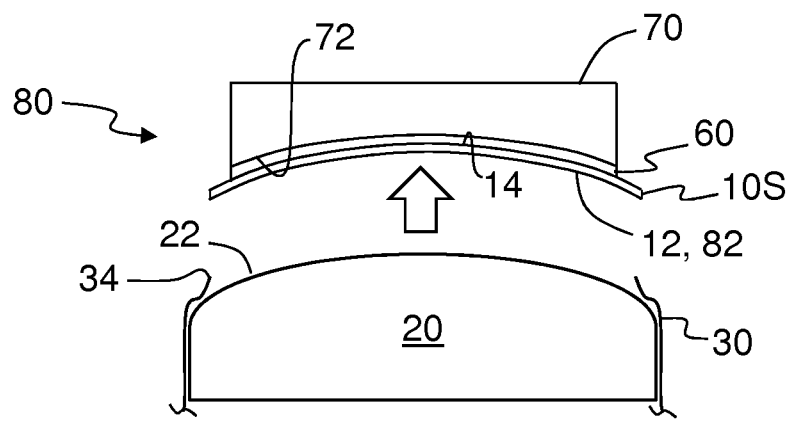
FIG. 8 shows the precision article being removed from the mandrel surface.

At this point, the sealing material 36 is removed from the back surface 14 of the shaped thin sheet 10, and the precision article 80 is detached from the surface 22 of mandrel 20, as shown in FIG. 8. The precision article 80 can be, for example, an optical mirror or optical mirror component. In an example, the precision surface 82 can be subjected to further processing, such the application of one or more coatings of material to define a desired reflectivity for a select wavelength or range of wavelengths to define a precision mirror.

Additional Process Considerations

The temperature of the process is governed largely by the curing requirements of adhesive layer 60. Most adhesives have a curing temperature from room temperature of nominally 20° C. to about 70° C., which is the typical glass transition temperature of epoxy resins. There are also higher-temperature curing adhesives, such as film adhesives and ceramic adhesives, that can be used if the precision article 80 has a high-temperature application.

The maximum temperature of operation of precision article 80 is generally governed by the adhesive 60 used. It is generally good practice to not exceed the glass transition temperature of the adhesive 60. Therefore, a normal epoxy resin would be limited to about 70° C. On the other hand, the operational temperature of the adhesive 60 can be in the range from 120° C. to 130° C. and the temperature of total degradation greater than 300° C. Also, a ceramic adhesive (cement) can be used for adhesive 60 for high-temperature operation of precision article 80.

As discussed above, mandrel 20 can be made of almost any material with the desired properties. There are no practical weight limits or size limits other than what is considered reasonable for the given situation. This enables the mandrel 20 to be constructed to an extremely high precision. Example materials for such precision tooling are ceramics or hard metals. In particular, example materials for mandrel 20 include glasses, particularly low thermal expansion types such as ZERODUR®, BOROFLOAT® or PYREX®. Metallic materials can be combined to produce a stable mass material with a hard coating layer to resist damage and to facilitate the surface quality required. Metallic mandrels can be made of aluminum, bronze or cast iron coated with electroless nickel or chromium, resulting in a stable, high-thermal-conductivity mass with a surface hardness of more than 1000 Vickers.

To facilitate the formation of a vacuum in the region 33 between the mandrel surface 22 and the front surface 12 of thin sheet 10, it is also possible to use a porous material for mandrel 20, which can be in metal or ceramic form, as can be produced from sintered powders. Examples of this type of material include as METAPOR® and ESPOR®

In many cases, the mandrel will need to have a good surface shape (small figure error) and a manageable amount of surface roughness. In some cases, the surface roughness needs to be no more than tens of nanometers root-mean-square (RMS) roughness, and preferably smaller if possible. The quality of the surface finish does not influence directly on the finished product, but may do so indirectly.

In an example, when thin sheet 10 is interfaced with surface 22 of mandrel 20, the interference patterns that arise between the surfaces 12 and 14 of the thin sheet 10 (if it is transparent), and the surface 22 of the mandrel (which can also be transparent) are evaluated. Such interference patterns are generated between two reflective or partially reflective surfaces and can indicate that the surfaces are not in close contact, as well as the degree of contact or lack of contact. The lack of close contact can be due to the presence of contamination or entrapped air. If the interference fringes indicate that close contact between the surface 22 of mandrel 20 and the thin sheet 10 has not occurred to the extent required, then the thin sheet can be removed, cleaned and reapplied to the mandrel (or another thin sheet used) to ensure proper contact prior to continuing the process.

The advantage of the surface roughness requirements of a mandrel with respect to a finished mirror is that the mandrel roughness requirement is not only much less stringent but also has no strict requirements on uniformity and can tolerate common polishing defects, such as scratch and dig.

Support structure 70 can be made of material that is selected based on its mechanical resistance, density, thermal conductivity and coefficient of thermal expansion. In an example, the material used should have sufficient mechanically stability to be conventionally machined to a few micrometers or tens of micrometers of precision to create a bonding surface that requires a minimum of adhesive to close the joint.

Example materials for support structure 70 include light weight metals, such as aluminum, magnesium, lithium and their alloys. Ceramics are also suitable for certain applications, and materials such as glass, silicon carbide and alumina are also suitable for certain applications. Alternative materials for specific applications can include beryllium and Invar. In some embodiments, glass can be used, including relatively thin layers of glass, e.g., 1 mm to 2 mm.

Support structure 70 can also be produced with specific features that make a light weight structure and/or thermal control before bonding to the shaped thin sheet 10. This process enables the use of conventional machining/welding in situations where the precision article 80 is relatively delicate, making it difficult to produce such features after the fact.

Dual-Sided Process

Figure 9A:
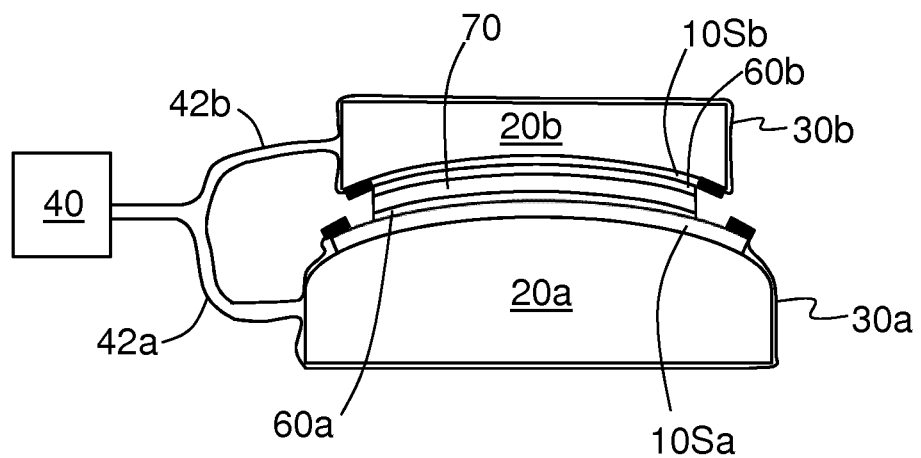
FIG. 9A is similar to FIG. 7 and illustrates an example configuration for forming a dual-sided precision article using two aligned mandrels having complementary surface shapes.
Figure 9B:
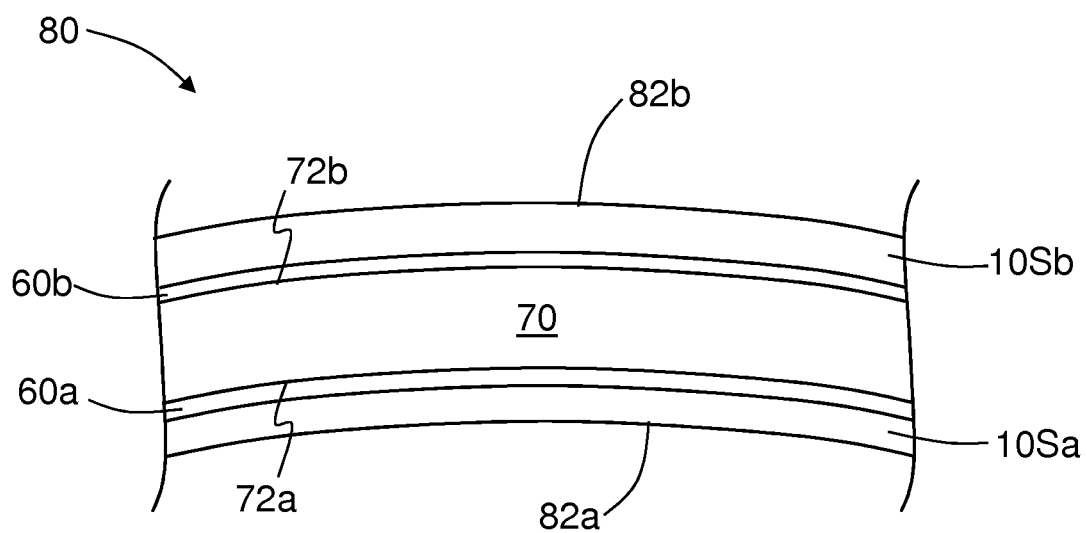
FIG. 9B is a close-up cross-sectional view of a portion of the dual-sided precision article showing the support structure as a layer of solid material in the middle of the layered structure.

The processes disclosed herein include a dual-sided process that forms a dual-sided precision article 80, such as illustrated in FIGS. 9A and 9B. The configuration of FIG. 9A shows two opposing and pre-aligned mandrels 20a and 20b each enclosed in respective collapsible structures 30a and 30b that include respective vacuum conduits 42a and 42b that are operably connected to vacuum pump 40. The collapsible structures 30a and 30b can also be operably connected to separate vacuum pumps.

The dual-sided process can be carried out as described above but for two thin sheets 10 respectively provided so that they interface with respective mandrels 20a and 20b to form respective shaped thin sheets 10Sa and 10Sb thereupon, as shown in FIG. 9A. FIG. 9B is a close-up cross-sectional view of a portion of the resulting two-sided precision article 80, which includes two precision surface 82a and 82b on opposite sides of the precision article.

The two shaped thin sheets 10Sa and 10Sb are bonded to respective opposite sides 72a and 72b of a support structure 70 using respective bonding layers 60a and 60b. The shaped thin sheets 10Sa and 10Sb as formed by the complementary shaped mandrels 20a and 20b provide the precision article with enhanced structural support that help the article maintain its shape, e.g., by balancing the various forces within the layered precision article. In an example, chamber 50 can be used in the dual-sided process, especially in the step after the bonding material layers 60a and 60b are formed but prior to the curing of these layers.

In the present dual-sided process, the support structure 70 can be made of a solid material, such as glass or lightweight metal or other lightweight solid material. Further in an example, the support structure 70 can be about 8 to 12 times thicker than the thickness of either of the shaped thin sheets 10Sa and 10Sb, and in an example is nominally 10 times thicker.

In an example, the shaped thin sheets 10Sa and 10Sb have each have thickness of between 0.2 mm and 0.4 mm, and the support structure 70 that serves as the core of the finished dual-sided precision article 80 has a thickness between 1 mm and 2 mm, or even between 1.1 mm and 1.5 mm. In an example, the final dual-sided precision article 80 has a substantially uniform thickness of between 2 mm and 6 mm and also in an example has a diameter on the order of a meter, and in an example the diameter is at least one meter. It is also noted here that the precision article 80 can have a gradual curvature (which defines a relatively long focal length, e.g., greater than 10 meters or even greater than 50 meters) or can be substantially planar (e.g., a focal length of greater than 100 meters or even 500 meters or even 1000 meters). Such a layered (laminated) structure is strong but also is also flexible and locally deformable when the diameter of the article is sufficiently large as compared to its overall thickness.

Adaptive Optical System

Figure 10:
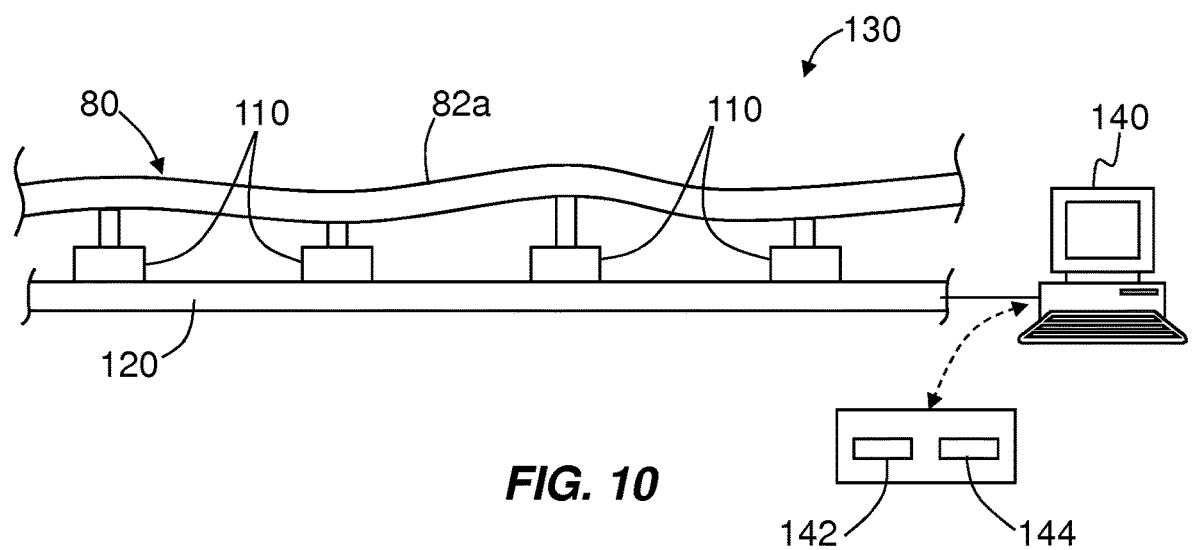
FIG. 10 is a close-up, cross-sectional view of an example adaptive optical system that employs the dual-sided precision article disclosed herein.

FIG. 10 shows a close-up cross-sectional view of a portion of the dual-sided precision article 80 disclosed above. The dual-sided precision article 80 is operably supported by an array of independently addressable actuators 110, which in turn are supported by a support plenum 120 to define an adaptive optical system 130. In the example shown, the precision surface 82a is used as the reflective surface. As discussed above, the precision surface 82a may include one or more layers of material to enhance its reflectivity at a select wavelength or range of wavelengths to define a mirror, such as a telescope mirror.

A controller 140 is operably connected to the array of actuators 110 and includes a processor 142 and a non-transient computer-readable medium 144 (which may be part of the processor, or a separate memory unit, etc.) that contains instructions (e.g., either in firmware or software) that cause the actuators to be independently addressed and activated in a select manner. In an example, the actuators 110 are activated to define a select surface shape for the precision surface 82a based on a select or desired optical wavefront for light reflected from the precision surface 82a. In an example, the desired optical wavefront is one that, when it forms an image (either by itself or in combination with other optical components) is substantially free of aberrations. Thus, in an example, the desired optical wavefront is one that serves to counteract the adverse effects of optical aberrations imparted to the incident wavefront, such as might occur when the wavefront travels through an aberrating medium such as the atmosphere.

Thus, the adaptive optical system 130 is configured to mechanically define a surface shape for the precision surface 82 under the operation of controller 140. Example adaptive optical systems are disclosed in U.S. Pat. Nos. 4,467,186; 4,967,063; 7,125,128; and 7,333,215.

In an example of the adaptive optical system 130 of FIG. 10, the precision article 80 can alternatively be the aforementioned single-sided precision article, such as shown in FIG. 8 and as discussed above. For such a precision article 80, the support structure 70 is preferably sufficiently thin to allow for the required local deformations of the precision surface for adaptive optics applications. It is anticipated that the dual-sided precision article 80 will demonstrate better optical performance in an adaptive optical system 130 due to the aforementioned balancing of forces within its laminated structure.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

The invention comprises aspects which are disclosed in the sentences below which are part of the description but not claims in accordance with J15/88 of the Boards of appeal Sentences 1. A process for forming a precision article, comprising:
   providing a thin sheet of material having front and back surfaces;
   placing the front surface of the thin sheet of material in contact with a surface of a mandrel, wherein the surface of the mandrel has a surface shape;
   arranging a collapsible enclosure around at least a portion of the thin sheet and at least a portion of the mandrel to form a sealed interior, with a portion of the back surface of the thin sheet interfacing with an external environment;
   forming at least a partial vacuum in the sealed interior to define a pressure differential between the sealed interior and the external environment, thereby causing the thin sheet to substantially conform to the mandrel surface to form a shaped thin sheet;
   securing the back side of the thin sheet to a support structure to define the precision article; and
   removing the precision article from the mandrel.
2. The process according to sentence 1, wherein the external environment has a pressure of one atmosphere.
3. The process according to sentence 1, wherein the external environment is defined by an environmental control chamber having an interior with a pressure, and wherein the interior pressure is controllable to between 1 atmosphere and 10 atmospheres.
4. The process according to sentence 1, wherein the thin sheet is made of glass.
5. The process according to sentence 1, wherein the mandrel resides within the collapsible enclosure.
6. The process according to sentence 1, further including coating the front surface of the shaped thin sheet with one or more layers of material to define a reflective surface either at a select wavelength or over a select range of wavelengths.
7. The process according to sentence 1, wherein the support structure is secured to the shaped thin sheet by a layer of securing material.
8. The process according to sentence 7, wherein the layer of securing material is an adhesive having a nominal thickness of 50 microns.
9. The process according to sentence 1, wherein the collapsible enclosure is in the form of a bag.
10. The process according to sentence 1, wherein the precision article defines a mirror.
11. A process for forming an article having a precision surface, comprising:
    providing a thin sheet having front and back opposite surfaces, and placing the front surface in contact with a surface of a mandrel, where the mandrel surface has a surface shape;
    establishing a pressure differential between front and back surfaces of the thin sheet so that the thin sheet is drawn onto the mandrel surface, thereby causing the thin sheet to substantially conform to the shape of the mandrel surface to form a shaped thin sheet;
    securing the shaped thin sheet to a support member to define the article; and removing the article from the mandrel, wherein the front surface of the shaped thin sheet defines the precision surface of the article.
12. The process according to sentence 11, wherein the pressure differential is nominally 1 atmosphere.
13. The process according to sentence 11, wherein the pressure differential is between 1 atmosphere and 10 atmospheres.
14. The process according to sentence 11, wherein the thin sheet is made of glass.
15. The process according to sentence 11, wherein forming the pressure differential includes arranging a collapsible enclosure around at least a portion of the thin sheet and at least a portion of the mandrel to form a sealed interior, and at least partially evacuating the sealed interior.
16. The process according to sentence 11, further including coating the precision surface with one or more layers of material to define a reflective surface at either select wavelength or over a select range of wavelengths.
17. The process according to sentence 11, wherein the support structure is secured to the shaped thin sheet by a layer of securing material.
18. The process according to sentence 17, wherein the layer of securing material is an adhesive having a nominal thickness of 50 microns.
19. A process for forming a dual-sided precision article, comprising:
    providing first and second thin sheets each having front and back opposite surfaces;
    placing the front surfaces of each of the front sheets in contact with respective first and second surfaces of first and second aligned mandrels, where the first mandrel surface has a first surface shape and the second mandrel surface has a second surface shape that is complementary to the first surface shape;
    establishing pressure differentials between front and back surfaces of each of the first and second thin sheets so that the first and second thin sheets are drawn onto their corresponding first and second mandrel surfaces, thereby causing the first and second thin sheets to substantially conform to the surface shapes of the respective first and second mandrel surfaces to respectively form first and second shaped thin sheets;
securing the shaped thin sheets to opposite sides of a common support member to define the article; and
removing the article from the first and second mandrels, wherein the front surfaces of the first and second shaped thin sheets define the first and second precision surfaces of the dual-sided precision article.

20. The process according to sentence 19, wherein the dual-sided precision article has a substantially uniform thickness in the range from 2 mm to 6 mm.

21. The process according to sentence 19, wherein the support member is a solid layer of glass or lightweight metal having a substantially uniform thickness in the range from 1 mm to 2 mm.

22. The process according to sentence 19, wherein the precision article has a diameter of at least 1 meter.

23. A process of forming an adaptive optical system, comprising:
performing the process of claim 19 to form the dual-sided precision article; and
operably supporting the first precision surface with an array of independently addressable actuators arranged to locally deform the dual-sided precision article to define a select surface shape for the second precision surface.

24. The process according to sentence 23, wherein the actuators are operably connected to a controller that includes a non-transient computer-readable medium having instructions embodied therein that cause the actuators to be independently activated to define the select surface shape.

The invention claimed is:

1. A process for forming an article, the article being an optical mirror, an optical mirror component, or an adaptive optical system, the process comprising: providing a thin sheet of material having front and back surfaces; placing the front surface of the thin sheet of material in contact with a surface of a mandrel to form a sealed collapsible envelope, wherein the sealed collapsible envelope extends around at least a portion of the thin sheet and the entire mandrel for creating at least a partial vacuum in the sealed collapsible envelope, with a portion of the back surface of the thin sheet interfacing with an external environment outside the envelope, and wherein the surface of the mandrel has a surface shape; establishing a pressure difference between front and back surfaces of the thin sheet so that the thin sheet is drawn onto the mandrel surface, thereby causing the thin sheet to substantially conform to the mandrel surface to form a shaped thin sheet; securing the back surface of the thin sheet to a support structure to define the article; and removing the article from the mandrel so that the thin sheet has a precision front surface for the article,
wherein the external environment has a pressure of at least one atmosphere.

2. The process according to claim 1, wherein the pressure difference between front and back surfaces of the thin sheet is created by the external environment defined by an environmental control chamber having an interior with a pressure, and wherein the interior pressure is controllable to between 1 atmosphere and 10 atmospheres.

3. The process according to claim 1, further including coating the front surface of the shaped thin sheet with one or more layers of material to define a reflective surface either at a select wavelength or over a select range of wavelengths.

4. The process according to claim 1, wherein the support structure is secured to the shaped thin sheet by a layer of securing material.

5. The process according to claim 4, wherein the layer of securing material is an adhesive having a thickness of about 50 microns.

6. The process according to claim 1, wherein the collapsible envelope forms a bag.

* * * * *